United States Patent
Lin et al.

(10) Patent No.: US 11,176,330 B2
(45) Date of Patent: Nov. 16, 2021

(54) GENERATING RECOMMENDATION INFORMATION

(71) Applicant: Advanced New Technologies Co., Ltd., Grand Cayman (KY)

(72) Inventors: Xiexiong Lin, Hangzhou (CN); Taifeng Wang, Hangzhou (CN); Jing Huang, Hangzhou (CN); Mengshu Sun, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/814,842

(22) Filed: Mar. 10, 2020

(65) Prior Publication Data
US 2021/0027018 A1   Jan. 28, 2021

Related U.S. Application Data

(63) Continuation of application No. PCT/CN2020/071682, filed on Jan. 13, 2020.

(30) Foreign Application Priority Data

Jul. 22, 2019 (CN) .......................... 201910662196.3

(51) Int. Cl.
*G06F 40/30* (2020.01)
*G06N 20/00* (2019.01)
(Continued)

(52) U.S. Cl.
CPC ............ *G06F 40/30* (2020.01); *G06F 40/279* (2020.01); *G06N 3/0454* (2013.01); *G06N 3/088* (2013.01); *G06Q 30/0276* (2013.01)

(58) Field of Classification Search
CPC .... G06F 40/211; G06F 40/253; G06F 40/268; G06F 40/284; G06F 40/30; G06N 20/00
See application file for complete search history.

(56) References Cited

U.S. PATENT DOCUMENTS 7,457,768 B2   11/2008   Horvitz et al.
10,740,564 B2 *  8/2020   Shu ..................... G06F 16/3344
(Continued)

FOREIGN PATENT DOCUMENTS

| CN | 108932335 | 12/2018 |
|----|-----------|---------|
| CN | 109992764 | 7/2019 |
| CN | 110427617 | 11/2019 |

OTHER PUBLICATIONS

PCT International Search Report and Written Opinion in International Application No. PCT/CN2020/071682, dated Apr. 26, 2020, 14 pages (with partial machine translation).

(Continued)

*Primary Examiner* — Lamont M Spooner
(74) *Attorney, Agent, or Firm* — Fish & Richardson P.C.

(57) ABSTRACT

Implementations of this disclosure provide methods and apparatuses for generating recommendation information. An example method includes matching text content from a text content library based on a plurality of predetermined scenario-related words; extracting keywords from the related text content, to generate a plurality of training samples; and for each training sample, providing a source sequence of a sequence pair corresponding to the training sample as an input to a recommendation information generation model, obtaining, from the recommendation information generation model, a predicted word, and adjusting a model parameter of the recommendation information generation model based on a comparison between the predicted word and a corresponding word in a target sequence of the sequence pair corresponding to the training sample, to train the recommendation information generation model.

21 Claims, 5 Drawing Sheets

(51) Int. Cl.
*G06N 3/08* (2006.01)
*G06F 40/279* (2020.01)
*G06N 3/04* (2006.01)
*G06Q 30/02* (2012.01)

(56) References Cited

U.S. PATENT DOCUMENTS

| | | | | |
|---|---|---|---|---|
| 2002/0010573 | A1* | 1/2002 | Wakita | G06F 40/247 |
| | | | | 704/2 |
| 2013/0024407 | A1* | 1/2013 | Thompson | G06F 16/353 |
| | | | | 706/12 |
| 2016/0012044 | A1* | 1/2016 | Franceschini | G06F 16/3344 |
| | | | | 707/722 |
| 2016/0012122 | A1* | 1/2016 | Franceschini | G06F 16/3334 |
| | | | | 707/739 |
| 2016/0012126 | A1* | 1/2016 | Franceschini | G06F 16/3344 |
| | | | | 707/735 |
| 2017/0011289 | A1* | 1/2017 | Gao | G06F 40/268 |
| 2018/0174020 | A1* | 6/2018 | Wu | G06N 3/08 |
| 2018/0210874 | A1* | 7/2018 | Fuxman | G06F 40/35 |
| 2018/0260827 | A1* | 9/2018 | Sullivan | G06N 3/0472 |
| 2020/0117712 | A1* | 4/2020 | Xu | G16H 50/20 |
| 2020/0218722 | A1* | 7/2020 | Mai | G06N 3/0454 |
| 2020/0380038 | A1* | 12/2020 | Rosset | G06F 16/313 |
| 2021/0011935 | A1* | 1/2021 | Walsh | G06Q 50/184 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

GENERATING RECOMMENDATION INFORMATION

CROSS-REFERENCE TO RELATED APPLICATIONS

This application is a continuation of PCT Application No. PCT/CN2020/071682, filed on Jan. 13, 2020, which claims priority to Chinese Patent Application No. 201910662196.3, filed on Jul. 22, 2019, and each application is hereby incorporated by reference in its entirety.

TECHNICAL FIELD

One or more implementations of the present specification relate to the field of computer technologies, and in particular, to methods and apparatuses for generating recommendation information by using a computer.

BACKGROUND

Recommendation information can be used to recommend products, services, etc. to the public through publicity. The recommendation information can briefly describe a target to be recommended. For example, in daily life, a marketing text content is recommendation information. An advertisement is used as an example. The marketing text content is usually simple, readable, unique, clear, catching, etc. In a conventional technology, the recommendation information is usually manually edited. This recommendation information generation method relies on manual writing experience/skills, involves high writing costs, and features low efficiency.

Natural language processing can be used to study various theories and methods that can implement effective communications between humans and computers by using a natural language. The natural language processing is widely applied to application scenarios in artificial intelligence, for example, automatic translation, speech recognition, and text content classification. In the information recommendation field, the natural language processing is used to implement more accurate and targeted information recommendation based on information about a recommended party and/or recommendation information. However, the natural language processing has limited use in specific information content to be recommended. In particular, when the recommendation information is a marketing text content (for example, an advertisement for a target to be recommended), it is more difficult to apply the natural language processing due to unique features of the marketing text content.

SUMMARY

One or more implementations of the present specification provide methods and apparatuses for generating recommendation information based on natural language processing, to alleviate the previous one or more problems.

According to a first aspect, a method for training a recommendation information generation model is provided, the generation model is an encoder-decoder network, and the method includes the following: matching a plurality of related text contents from a text content library by using a plurality of predetermined scenario-related words; extracting keywords from each related text content, to generate a corresponding training sample, where each training sample corresponds to each sequence pair, the sequence pair includes a source sequence and a target sequence, the source sequence is a sequence of keywords extracted from a corresponding related text content, and the target sequence is a word sequence obtained after word segmentation processing is performed on the corresponding related text content; and using the source sequence corresponding to each training sample as an input to the generation model, and adjusting a model parameter based on a comparison between a predicted word of the generation model and a corresponding word in the target sequence, to train the generation model, where in a process of predicting a word by the generation model, probability distribution of words in a word list is adjusted by using pointer distribution, to increase the probability that keywords that are in the source sequence and input to the generation model appear in a prediction result.

In an implementation, the matching a plurality of related text contents from a text content library by using a plurality of predetermined scenario-related words includes at least one of the following: matching, from the text content library, a text content that includes more than a predetermined quantity of scenario-related words as the related text content; and extracting keywords from each text content in the text content library, determining a word matching degree between the text content keywords corresponding to each text content and the plurality of scenario-related words, and determining a text content whose word matching degree is greater than a matching degree threshold as the related text content.

In an implementation, after the matching a plurality of related text contents, the method further includes the following: inputting the matched related text contents to a pre-trained classification model, to determine text content categories of the related text contents; and screening out a text content whose text content category is not a predetermined category from the matched related text contents.

In an implementation, the text content category includes at least one of the following: an information text content, a marketing text content, and a common sense text content.

In an implementation, the generation model includes an encoder neural network and a decoder neural network, and the adjusting a model parameter based on a comparison between an output result of the generation model and the target sequence includes: transmitting a received source sequence and an output result obtained by the encoder neural network based on the source sequence to a neuron of the decoder neural network at each moment, and sequentially inputting, to the decoder neural network at each moment, a target sequence obtained after a sequence start identifier is added; and comparing a predicted word of the decoder neural network at each moment with a word corresponding to each moment in a target sequence obtained after a sequence end identifier is added, and adjusting the model parameter of the encoder-decoder network.

In an implementation, a pointer distribution weight at the first moment is positively correlated with weighted values of a state of a neuron at a current moment, an output of the neuron at the current moment, and an input word at the current moment, and weights applied to each term are model parameters; and that probability distribution of words in a word list is adjusted by using pointer distribution includes: using the pointer distribution weight as a weight coefficient of a word distribution probability of the word in the word list, and using a difference between 1 and the pointer distribution weight as a weight coefficient of a word distribution probability of a word received by the encoder neural network at the current moment.

In an implementation, the weight coefficient in the pointer distribution weight is adjusted based on a loss function to which a penalty of similarity between a current attention vector and the sum of historical attention vectors is added, and the loss function is positively correlated with the similarity between the current attention vector and the sum of historical attention vectors.

According to a second aspect, a method for generating recommendation information is provided, and the method includes the following: obtaining a plurality of keywords provided by a user for a target to be recommended; determining word vectors respectively corresponding to the keywords; sequentially inputting the word vectors to a pre-trained generation model, to predict a predetermined quantity of word sequences as candidate text contents, where the generation model is an encoder-decoder network, and in a process of predicting a word sequence, a probability of a word in a word list is adjusted by using pointer distribution, to increase the probability that the plurality of keywords appear in a prediction result; and selecting a text content that satisfies a condition from the candidate text contents as recommendation information of the target to be recommended.

In an implementation, the encoder-decoder network includes an encoder neural network and a decoder neural network, the encoder neural network is configured to convert an input word sequence into a semantic vector, the decoder neural network is configured to predict a predetermined quantity of character sequences based on the semantic vector, and the encoder neural network or the decoder neural network is one of a recurrent neural network, a bidirectional recurrent neural network, a gated recurrent unit, and a long short-term memory model.

In an implementation, the decoder neural network is configured to predict the predetermined quantity of character sequences based on the semantic vector, including: predicting a predetermined quantity of headwords at the first moment by using a neuron of the decoder neural network based on the semantic vector and a sequence start identifier; and determining, at the tth moment for each word sequence that is predicted at the (t−1)th moment and is in a one-to-one mapping relationship with each headword based on the semantic vector by using the neuron of the decoder neural network, a word with the highest probability currently, to form a current word sequence with a predicted corresponding word sequence as a word sequence predicted at the tth moment, where t is a natural number greater than 1.

In an implementation, the selecting a text content that satisfies a condition from the candidate text contents as recommendation information of the target to be recommended includes: predicting, by using a pre-trained language model, each probability that each character sequence appears as a sentence; and selecting, based on each probability, a character sequence that satisfies one of the following conditions as the recommendation information of the target to be recommended: a character sequence belongs to a predetermined quantity of character sequences and is with the highest probability, and a character sequence is with a probability greater than a predetermined probability threshold.

According to a third aspect, an apparatus for training a recommendation information generation model is provided, the generation model is an encoder-decoder network, and the apparatus includes the following: a matching unit, configured to match a plurality of related text contents from a text content library by using a plurality of predetermined scenario-related words; a sample generation unit, configured to extract keywords from each related text content, to generate a corresponding training sample, where each training sample corresponds to each sequence pair, the sequence pair includes a source sequence and a target sequence, the source sequence is a sequence of keywords extracted from a corresponding related text content, and the target sequence is a word sequence obtained after word segmentation processing is performed on the corresponding related text content; and a model training unit, configured to use the source sequence corresponding to each training sample as an input to the generation model, and adjust a model parameter based on a comparison between a predicted word of the generation model and a corresponding word in the target sequence, to train the generation model, where in a process of predicting a word by the generation model, probability distribution of words in a word list is adjusted by using pointer distribution, to increase the probability that keywords that are in the source sequence and input to the generation model appear in a prediction result.

According to a fourth aspect, an apparatus for generating recommendation information is provided, and the apparatus includes the following: an acquisition unit, configured to obtain a plurality of keywords provided by a user for a target to be recommended; a determining unit, configured to determine word vectors respectively corresponding to the keywords; a prediction unit, configured to sequentially input the word vectors to a pre-trained generation model, to predict a predetermined quantity of word sequences as candidate text contents, where the generation model is an encoder-decoder network, and in a process of predicting a word sequence, a probability of a word in a word list is adjusted by using pointer distribution, to increase the probability that the plurality of keywords appear in a prediction result; and a selection unit, configured to select a text content that satisfies a condition from the candidate text contents as recommendation information of the target to be recommended.

According to a fifth aspect, a computer readable storage medium is provided, where the computer readable storage medium stores a computer program, and when the computer program is executed in a computer, the computer is enabled to perform the method in the first aspect or the second aspect.

According to a sixth aspect, a computing device is provided, and includes a memory and a processor, where the memory stores executable code, and when executing the executable code, the processor implements the method in the first aspect or the second aspect.

According to the methods and apparatuses provided in the implementations of the present specification, in the recommendation information generation process, only the plurality of keywords determined by the user for the target to be recommended are obtained, the at least one character sequence is predicted as the candidate text content by using the generation model for processing a natural language sequence, and the recommendation information is determined from the candidate text content. As such, manual participation is decreased and the manual planning level constitutes no limitation, and diversified candidate text contents can be generated, thereby improving efficiency and effectiveness of generating the recommendation information. Further, in the process of predicting a word sequence as a candidate text content by the generation model, the probability distribution of the words in the word list is adjusted by using the pointer distribution, to increase the probability that the keywords input to the model appear in a predicted word sequence, thereby improving accuracy of the prediction result of the generation model.

BRIEF DESCRIPTION OF DRAWINGS

To describe the technical solutions in the implementations of the present disclosure more clearly, the following briefly describes the accompanying drawings needed for describing the implementations. Clearly, the accompanying drawings in the following description show merely some implementations of the present disclosure, and a person of ordinary skill in the art can further derive other drawings from these accompanying drawings without creative efforts.

DESCRIPTION OF IMPLEMENTATIONS

The following describes the solutions provided in the present specification with reference to the accompanying drawings.

Figure 1:
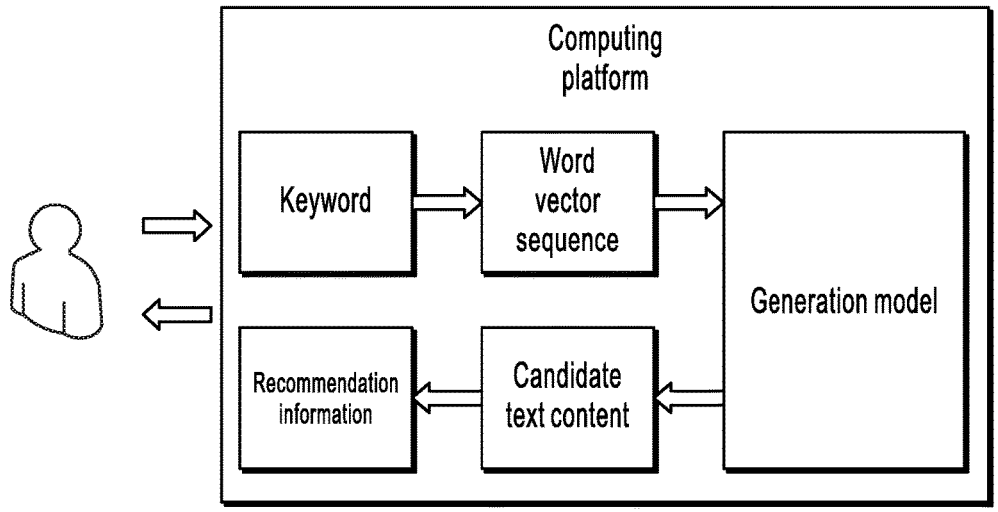
FIG. 1 is a schematic diagram illustrating an implementation scenario of an implementation, according to the present specification.

FIG. 1 is a schematic diagram illustrating an implementation scenario of an implementation, according to the present specification. In the implementation scenario, a user can interact with a computing platform to provide keyword information of a target to be recommended for the computing platform and obtain recommendation information of the target to be recommended from the computing platform. The computing platform can be a hardware device such as a computer, a tablet computer, or a smartphone, or can be an application running in a hardware device. Implementations are not limited in the implementation scenario. In an implementation, the computing platform is an end-user device application, and the user can directly interact with the computing platform. In another implementation, when the computing platform is a server that provides support for an application run by an end-user device, the user directly interacts with the end-user device, and the end-user device interacts with the server through a network, so that the user indirectly interacts with the computing platform.

In the scenario shown in FIG. 1, when determining the recommendation information for the target to be recommended, the user can provide at least one keyword for the computing platform, and the computing platform generates the recommendation information, and feeds back the recommendation information to the user. The target to be recommended can be various services, products, etc. The computing platform can store a pre-trained generation model. The computing platform can obtain the at least one keyword input or selected by the user, and input a word vector corresponding to each keyword to the generation model. The generation model generates a predetermined quantity of candidate text contents. Further, a text content that satisfies a condition is selected from the candidate text contents as the recommendation information of the target to be recommended.

The generation model can be a neural network based on natural language processing, for example, an encoder-decoder network (Encoder-Decoder). The encoder-decoder network can be used to handle sequence-to-sequence problems. The recommendation information can be considered as a sequence of a plurality of words. A predetermined quantity of pieces of recommendation information can be generated based on input keywords by using the generation model, so that diversified recommendation information is generated, and therefore efficiency and effectiveness of generating the recommendation information is improved.

The following first describes a process of training a generation model.

Figure 2:
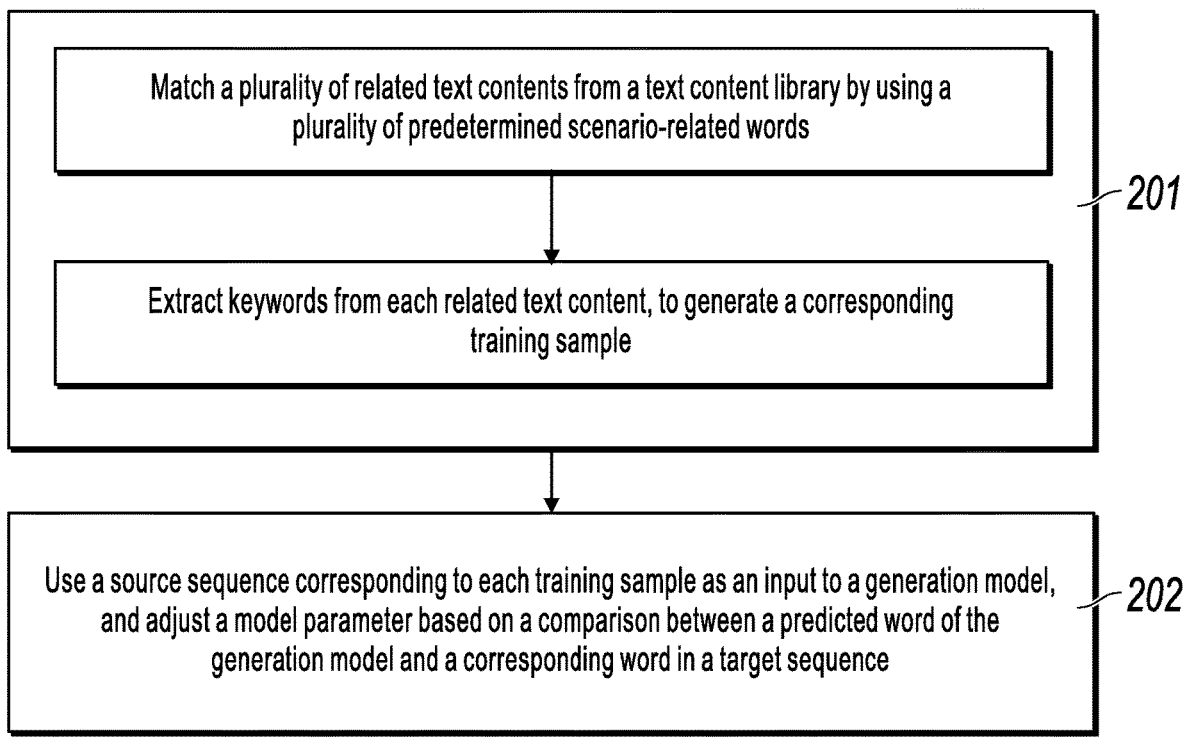
FIG. 2 is a flowchart illustrating a method for training a recommendation information generation model, according to an implementation.

As shown in FIG. 2, the process of training the generation model can be generally divided into two steps: Step 201: Select a sample. Step 202: Train the model.

In the implementation of the present specification, the training sample can be determined based on a plurality of related text contents related to a current scenario. Each related text content can have a plurality of keywords as sample features, and the related text content can be used as a corresponding sample label.

It can be understood that in a process of selecting a related text content, training samples of similar scenarios can be used to improve accuracy of a trained model. Therefore, when a related text content is selected, a plurality of scenario-related words can be predetermined, the scenario-related words are matched with a text content in a text content library, and a matched text content is used as the related text content.

The scenario-related words can be various scenario-related words. For example, in a marketing scenario, words such as "xx supermarket", "New Year goods", "personal hygiene", "clothing", "red packet", "offline payment", and "coupon" can be selected as scenario-related words. The scenario-related words can be manually determined, can be captured from a predetermined website based on a related category, or can be extracted from description information of a related scenario. For example, words such as "summer", "fat", and "mother" are extracted from "welfare of a fat mother in summer" as keywords.

Optionally, word expansion can be performed on a few initially determined scenario-related words, to automatically recall more related words by using the existing words. The word expansion can be performed by using a synonym, a near-synonym, an associated word, a word with similar semantics, etc. The synonym and the near-synonym can be determined based on a record in a dictionary. The associated word can be a context content word (a neighboring word in the text content). For example, an associated word of "rice rust" can be "non-fried" or "crispy".

Then, the scenario-related words are matched with the text content in the text content library.

In an implementation, the quantity of scenario-related words in each text content can be counted. When the quantity of scenario-related words in the text content is greater than a predetermined value (for example, 5), it is determined that the text content matches the scenario-related words, and the corresponding text content can be determined as the related text content.

In another implementation, keywords can be extracted from each text content in the text content library (the extraction process is described in detail below), and a matching degree between the keywords in the text content and the scenario-related words is calculated. The matching degree can be determined by using a text content similarity method such as a Jaccard coefficient and cosine similarity. The Jaccard coefficient is used as an example. Assume that any text content in the text content library is a first text content. In this case, a matching degree between the scenario-related words and the first text content can be the quantity of same words in the scenario-related words and keywords in the first text content/the sum of the quantity of scenario-related words and the quantity of keywords in the first text content. When the matching degree between the first text content and the scenario-related words is greater than a predetermined matching threshold (for example, 50%), the first text content can be determined as the related text content.

In an optional implementation, to further improve correlation between a training sample and a scenario, after the plurality of related text contents that match the scenario-related words are selected, the related text contents can be further screened. The related text contents can be input to a pre-trained classification model, and the classification model outputs probabilities of the related text contents in terms of category, to filter out a related text content whose probability is less than a predetermined value (for example, 10%) in the related scenario. The classification model can be a multi-tasking model, that is, have a plurality of output results. Each output result corresponds to a probability that a text content belongs to a corresponding category. For example, the text content category can include but is not limited to a news text content, an information text content, a political text content, a marketing text content, and an agricultural text content.

Then, each selected related text content is constructed as a training sample of the generation model. Each training sample corresponds to each sequence pair. The sequence pair includes a source sequence and a target sequence. The source sequence is a sequence of keywords extracted from the corresponding related text content, and the target sequence is a word sequence obtained after word segmentation processing is performed on the corresponding related text content. Keywords in the related text content can be extracted in a process of matching the text content with the scenario-related words, or can be extracted after text content screening is completed. Implementations are not limited here. The keywords can be extracted from the related text content by using a method such as TextRank or LDA.

The following uses TextRank as an example to describe a keyword extraction process of a first related text content.

First, processing such as word segmentation, stopword removal, part of speech tagging, and retention of a predetermined part of speech is performed on the related text content. For example, for the text content "a small interesting home bench, life is so great", words such as "home" (adjective), "interesting" (adjective), "small" (adjective), "bench" (noun), "life" (noun), and "great" (adjective) can be obtained after processing. These words can be referred to as candidate words. Each word is used as a node to establish a graphical model, and an edge between nodes is determined by co-occurrence of words. The co-occurrence of words is determined by a window with a fixed size (for example, a window with a length of two words). If a word and another word are in the same window, an edge is added between the two words to establish a graphical model.

As such, weights of nodes are iteratively propagated based on the following equation until convergence:

$$WS(V_i) = (1-d) + d \times \Sigma_{V_j \in In(V_i)} \frac{w_{ji}}{\Sigma_{V_k \in Out(V_j)} w_{jk}} WS(V_j),$$

where $V_i$ represents word i, $V_j$ represents a word connected to word i, $In(V_i)$ represents a word set connected to word i, $Out(V_j)$ represents a word set connected to word j, $V_k$ represents a connected word, $WS(V_i)$ and $WS(V_j)$ respectively represent PR values of word i and word j, $w_{ji}$ and $w_{jk}$ respectively represent connection weights (the weight can be proportional to the corresponding quantity of connection edges) between word i and word j and between word i and word k, and d is a damping factor, and is used to ensure that each word has a PR value greater than 0. A value of d can be a constant determined by experiments. For example, when d is 0.85, a stable converged PR value can be obtained by performing iteration for 100 times.

When the previous equation converges, the weights of the nodes (words) are obtained. The weights of the nodes are sorted in a reverse order, and a predetermined quantity (for example, 10) of words whose weights are arranged in the top places are used as keywords corresponding to the text content. Optionally, if a plurality of words in the predetermined quantity of words are neighboring words in the original text content, a multi-word keyword can be obtained through combination.

Each training sample can be constructed when keywords corresponding to a related text content of each training sample are obtained. Each training sample can correspond to one sequence pair. Each sequence pair includes a source sequence (source) and a target sequence (target). The source sequence is a sequence of keywords extracted from a corresponding related text content, and the target sequence is a word sequence obtained after word segmentation processing is performed on the corresponding related text content. The following example is provided:

| Training sample | Source sequence | Target sequence |
| --- | --- | --- |
| Sample 1 | Right brain Learning | xx uses a new right brain imagery thinking to cognitively learn Chinese characters, convert each Chinese character into a specific animated image, and combine animations, sounds, pictures, and words, to stimulate the development of children's vision, hearing, touch, and other senses, quickly activate the right brain, and stimulate children's intellectual development |
| Sample 2 | Health Weight Lose weight | xx weight loss gadgets include a body mass index (bmi), a healthy weight range, and the most healthy standard weight |
| ... | ... | ... |
| Sample n | Obesity Energy | Use a waist-to-hip ratio to determine obesity and a calculator of basic energy consumption for a body to maintain normal physiological functions, basal metabolism, physical energy consumption, and the thermic effect of food |

Then, the generation model can be trained based on the determined training sample. In the implementation of the present specification, a sequence-to-sequence (Seq2seq) model can be selected as the generation model, namely, an encoder-decoder network (Encoder-Decoder). Encoding means to convert an input sequence into a vector with a fixed length. Decoding means to convert a previously generated fixed vector into a sequence for output. The encoding process is used to parse a language meaning in an input character sequence, and the decoding process is used to express a language meaning obtained through parsing by using another character sequence.

It can be understood that each of the encoder neural network and the decoder neural network can be a neural network for processing a sequence, for example, one of a convolutional neural network (CNN), a recurrent neural network (RNN), a bidirectional recurrent neural network (BioRNN), a gated recurrent unit (GRU), and a long short-term memory (LSTM) model.

Figure 3:
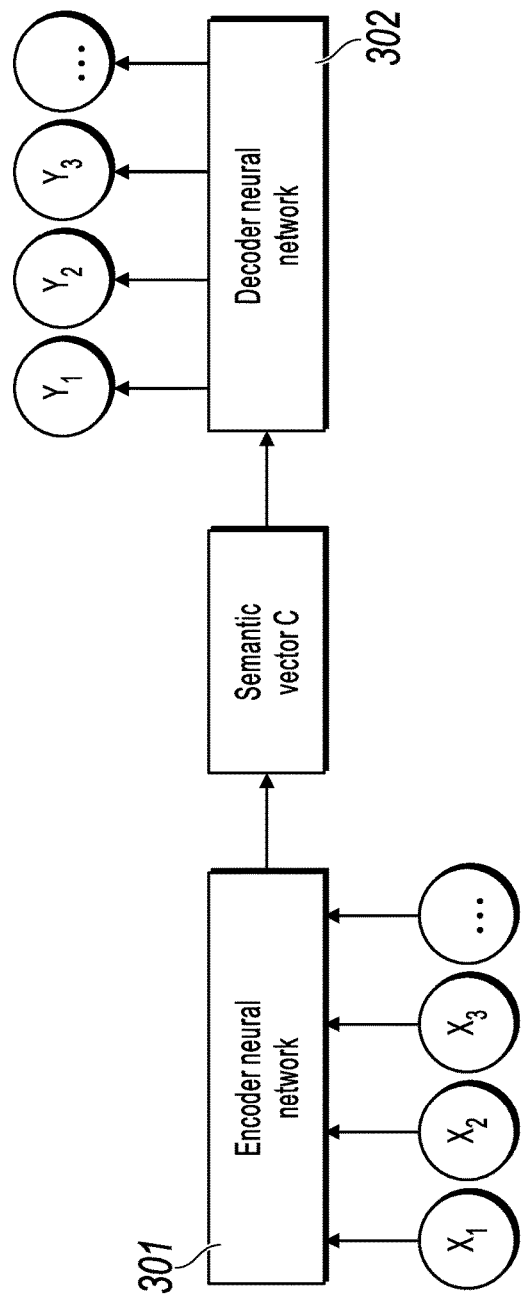
FIG. 3 is a schematic diagram illustrating an encoder-decoder network.

As shown in FIG. 3, the encoder-decoder network can be implemented by using two neural networks. The first neural network 301 implements an encoder, and is referred to as an encoder neural network, and the second neural network 302 implements a decoder, referred to as a decoder neural network. Semantic vector C output by the neural network 301 is used as an input to the neural network 302. The encoder neural network 301 and the decoder neural network 302 are connected by transmitting semantic vector C. Inputs to the encoder neural network 301 are character vector sequences "$X_1$", "$X_2$", "$X_3$", etc. Outputs of the decoder neural network 302 correspond to character sequences "$Y_1$", "$Y_2$", "$Y_3$", etc. The encoder-decoder network can be trained as a whole.

For the training sample, keywords in the source sequence can be arranged randomly, or can be arranged based on a specific rule, for example, a noun is arranged after an adjective. The target sequence can be a word sequence of words obtained by dividing the related text content or a word vector sequence of word vectors corresponding to words.

Figure 4:
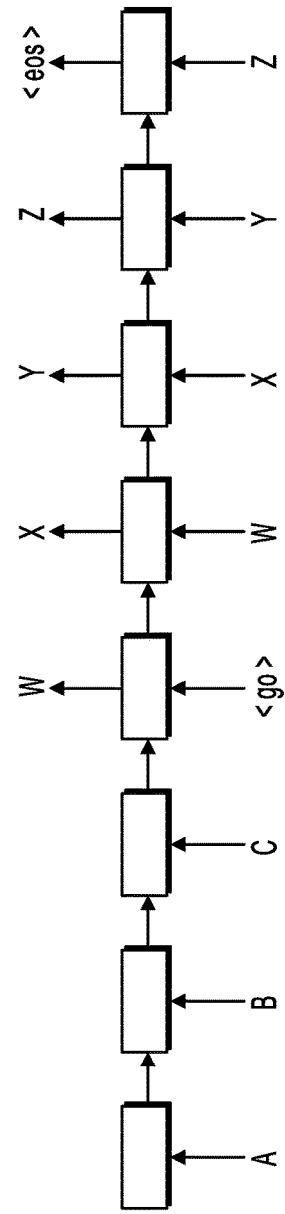
FIG. 4 is a schematic diagram illustrating deploying an encoder-decoder network in a chronological order in a specific example.

For clearer description of the process of training the encoder-decoder network, references can be made to both FIG. 3 and FIG. 4. FIG. 4 is a schematic diagram in which hidden units (neurons) of the neural network 301 and the neural network 302 in FIG. 3 are deployed in a chronological order in a process of inputting a specific sample to the encoder-decoder network. Actually, when the neural network 301 and the neural network 302 are implemented by using a recurrent neural network (RNN), an LSTM, etc., each of the neural network 301 and the neural network 302 can include only one neuron. The neuron can receive different input data in sequence at different moments, and provide different output results.

In FIG. 4, assume that source sequences of a sequence pair are A, B, and C, and target sequences are of the sequence pair are W, X, Y, and Z. First, source sequences A, B, and C are sequentially input to the neural network 301 as features at different moments. The neural network 301 converts the input sequence into a semantic vector with a fixed length, and then transmits the semantic vector to the neural network 302. The semantic vector can be transmitted backwards at each moment by using the neural network 302.

For the neural network 302, to make an output result more accurate, in the model training phase, the target sequence needs to be first processed, and an input to the neuron of the neural network 302 at each moment needs to be adjusted, so that the input at each moment is a previous word or a word vector corresponding to a previous word, and is not a word predicted at a previous moment. As shown in FIG. 4, input data received by the neuron of the neural network 302 at each moment is a sequence start identifier (for example, go), W, X, Y, or Z. The sequence start identifier indicates a start of sequence prediction. The semantic vector with a fixed length obtained by using the neural network 301 is transmitted by the neuron at different moments. In FIG. 4, at an initial moment, the neuron receives an input sequence start identifier "go", and predicts the first word (namely, a word corresponding to "W") based on a semantic vector. At a next moment, the neuron receives an input word or word vector corresponding to word "W" and the semantic vector inherited from the initial moment, predicts the second word (a word corresponding to "X") that forms a sequence with first word "W", and then outputs sequences W and X. By analogy, until the neuron receives last word "Z" or a corresponding word vector, and predicts the last word (a word corresponding to sequence end identifier eos) based on a semantic vector inherited from a previous moment.

In the model training process, the output of the decoder neural network at each moment can be determined by the input. That is, for each input, a word can be selected based on probability distribution of words in a word list. The word probability distribution can be implemented, for example, by using an attention mechanism.

$e_i^t = v^T \tanh(w_h h_i + w_s s_t + b_{attn})$, and $a^t = \text{softmax}(e^t)$, where i represents a current word, $h_i$ represents an output result of the current word, $s_t$ represents a current state of the neuron, $w_h$ and $w_s$ represent corresponding weights, $b_{attn}$ represents a constant parameter, $w_h$, $w_s$, and $b_{attn}$ are adjusted and determined in the model training phase, and are used in the prediction phase, the softmax function represents a normalized exponential function used to normalize a logarithm gradient of a discrete probability distribution of a finite term, and $a^t$ can be understood as an attention vector of the current word.

That a weight of a hidden state is input to generate a context content vector (context content vector, namely, the semantic vector described above) is:

$h_t^* = \Sigma_i a^t h_i$.

In this case, the probability distribution of the words in the word list can be:

$P_{vocab} = \text{softmax}(V'(V[s_t, h_t^*] + b) + b')$, where

V represents a transformation vector, $V[s_t, h_t^*]$ represents to combine $s_t$ and $h_t^*$ into one vector by using transformation vector V, and b represents a constant vector. For example, there are only three words "I", "am", and "student" in the word list. A finally determined probability of "I" is 0.3, a finally determined probability of "am" is 0.6, and a finally determined probability of "student" is 0.1 after a start identifier is received. It can be understood that in the prediction process, a distribution probability of a word in the word list varies with different input words. Therefore, a distribution probability of each word in the word list needs to be determined again after each word is input.

A person skilled in the art needs to understand that keywords that are input to the generation model are keywords that are expected to appear in a final text content. If the input keywords are new words for the word list, the generation model may fail to predict the words. To alleviate this problem, a conventional encoder-decoder neural network can be revised, so that there is a probability that both a new word in the input keywords and the word in the word list can be selected.

Figure 5:
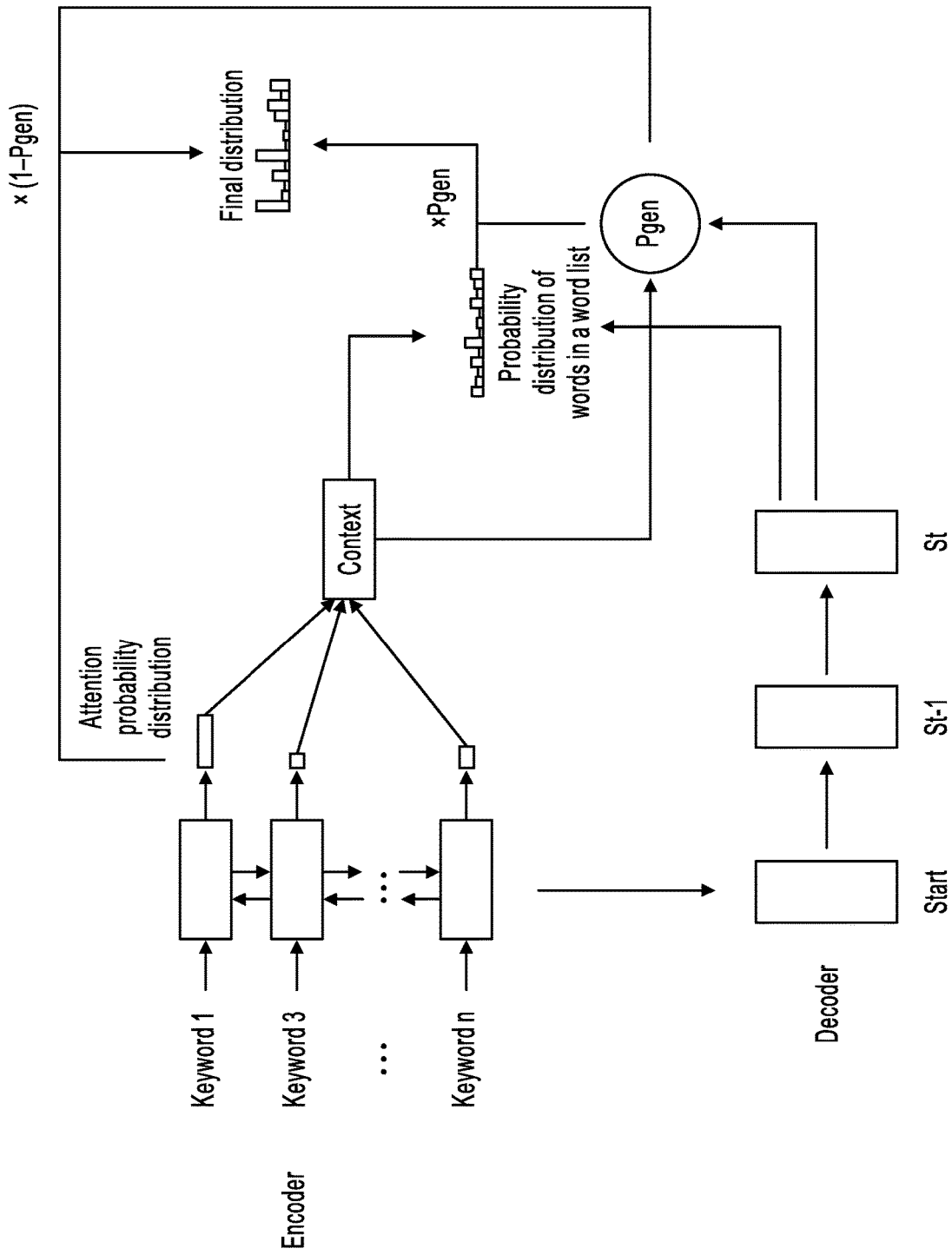
FIG. 5 is a schematic diagram illustrating adjusting word probability distribution by using pointer distribution in a recommendation information generation process, according to an implementation.

References can be made to FIG. 5.

In FIG. 5, a mixed distribution weight obtained after a pointer is added can be:

$P_{gen} = \sigma(w_h^T h_t^* + w_s^T s_t + w_x^T x_t + b_{ptr})$, where $P_{gen}$ represents a distribution weight of the word in the word list, $h_t^*$ represents the semantic vector generated by the encoder neural network, $s_t$ represents a state of the decoder neural network at moment t, $x_t$ represents an input to the decoder neural network at moment t, $w_h$, $w_s$, and $w_x$ represent corresponding weights, $b_{ptr}$ represents a constant term, and $w_h$, $w_s$, $w_x$, and $b_{ptr}$ are parameters of the generation model that are adjusted in the model training process. Further, adjusting the word probability distribution by using a pointer distribution probability can be:

$$P(w)=P_{gen}P_{vocab}(w)+(1-P_{gen})\Sigma_{i=w_i}a_i^t, \text{ where}$$

$P_{vocab}(w)$ represents the probability distribution of the words in the word list, $1-P_{gen}$ represents a distribution weight of each word received by the encoder model, and $a_i^t$ represents a word vector a word received at moment t. It can be understood that by comprehensively considering the pointer distribution probability, when word prediction at a next moment is performed, both the word in the word list and a word received by the encoder neural network can be considered, thereby alleviating a problem that a related word cannot be predicted when the word received by the encoder neural network does not appear in the word list. The word received by the encoder neural network can be transmitted by the neuron at each moment, and is transmitted to the decoder neural network.

It can be understood that in a grammar structure, there is usually a low probability that a word repeatedly appears. That is, if a word is output by the generation model, there is usually a low probability that the word is output thereafter. In the process of training the generation model, there is a very low probability that a word received by the neuron at a current moment appears in a prediction result at the current moment. To enable the output of the generation model to follow this rule, a coverage mechanism can be introduced to a pointer generator based on a possible design. Input words previously focused on by the model are recorded by covering vectors, and the information is brought into the current attention mechanism for calculation, to alleviate continuous attention to the same words. For example, the sum of attention vectors of the words that are previously focused on is:

$$c^t=\Sigma_{t'=0}^{t-1}a^{t'}.$$

In calculation of a current attention vector, $e_i^t$, can be:

$$e_i^t=v^T\tanh(w_h h_i+w_s s_t+w_c c_i^t+b_{atm}).$$

It can be seen that in comparison with the previous attention calculation, the sum of attention vectors of the existing words is also considered. The attention vector can be used to indicate words that are focused on in each step of generation, and the sum of attention vectors of the previous words can reflect the words that are previously focused on. Therefore, weights of the related words can be reduced to reduce current attention to the words that are previously focused on.

In an optional implementation, a penalty of similarity between the current word attention vector and the sum of historical attention vectors can be added to loss calculation, to alleviate repetition of output words. For example, the following term is added to a loss function:

$$\text{cov loss}_t=\Sigma_i \min(a_i^t,c_i^t), \text{ where}$$

$\min(a_i^t, c_i^t)$ represents the similarity between current word attention vector $a_i^t$ and the sum $c_i^t$ of historical attention vectors. A total loss function can be:

$$\text{loss}_t=-\log P(w^*_t)+\mu\cdot\text{cov loss}_t.$$

That is, a term related to the historical output word is added to the loss function. A higher similarity between $a_i^t$ and $c_i^t$ indicates a larger value of $\text{cov loss}_t$ and a larger value of the loss function. In this case, to reduce the value of the loss function, the similarity between $a_i^t$ and $c_i^t$ needs to be minimized. That is, in the process of training the generation model, to make the value of the loss function decreased, a weight corresponding to the attention vector of the historical word needs to be decreased.

The following describes a process of generating recommendation information by using the generation model trained by using the previous method.

Figure 6:
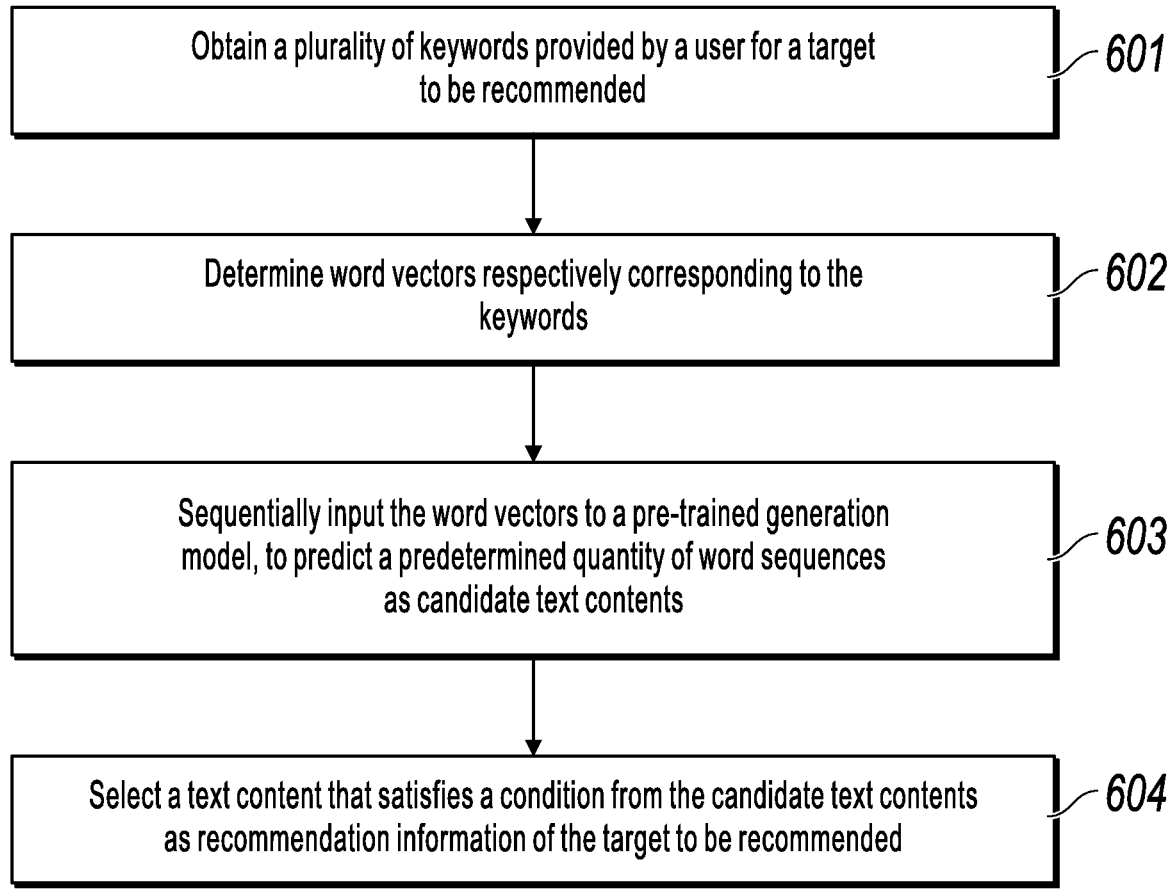
FIG. 6 is a flowchart illustrating a method for generating recommendation information, according to an implementation.

FIG. 6 is a flowchart illustrating a method for generating recommendation information, according to an implementation. The method can be performed by any system, device, apparatus, platform, or server that has a computing and processing capability, for example, the computing platform shown in FIG. 1. As shown in FIG. 6, the method includes the following steps: Step 601: Obtain a plurality of keywords provided by a user for a target to be recommended. Step 602: Determine word vectors respectively corresponding to the keywords. Step 603: Sequentially input the word vectors to a pre-trained generation model, to predict a predetermined quantity of word sequences as candidate text contents, where the generation model is an encoder-decoder network, and in a process of predicting a word sequence, a probability of a word in a word list is adjusted by using pointer distribution, to increase the probability that the plurality of keywords appear in an output result. Step 604: Select a text content that satisfies a condition from the candidate text contents as recommendation information of the target to be recommended.

First, in step 601, the plurality of keywords provided by the user for the target to be recommended are obtained. It can be understood that the target to be recommended can be anything expected to be recommended by the user to another user, for example, clothing, a financial platform, an APP, or an applet.

The user can provide the plurality of keywords for the target to be recommended, and these keywords can reflect core features of the target to be recommended. The user can manually input these keywords, can select related keywords from a given keyword set. Implementations are not limited here. For example, keywords for an electric fan can include high end, quiet, remote control, vertical, etc.

The plurality of keywords can be classified by category. Keyword categories can be a keyword of product benefits, a keyword of advantages, etc. The product benefits can be benefits to a user, for example, a full reduction amount and a prize provided. The advantages can be product advantages, for example, the advantage of a fan is quiet, and the advantage of a range hood is smokeless (the wind is strong, and removal of smoke is thorough).

These keywords can be keywords determined by the user for the recommendation information of the target to be recommended, and can be keywords that appear in the final recommendation information.

Next, in step 602, the word vectors corresponding to the keywords are determined. A method for determining the word vector can be, for example, a one-hot representation, a matrix distributed representation (Glove Vector), and word2vec. Implementations are not limited here.

Then, in step 603, the word vectors are sequentially input to the pre-trained generation model, to predict the predetermined quantity of candidate text contents. To alleviate a problem that the keywords cannot be predicted by the generation model because the keywords are new words relative to the word list, in the process of predicting a word by the generation model, the probability of the word in the word list can be adjusted by using the pointer distribution, to increase the probability that the plurality of keywords appear in the output result. That is, the probability in the word list is adjusted during prediction of a word, word probability distribution fusion is performed on the input keywords and the word in the word list by using the pointer distribution, to obtain probabilities corresponding to the word in the word list and the input keywords, and sequence prediction is performed based on the probabilities, to obtain the plurality of candidate text contents.

In the process of determining a character sequence by using a decoder neural network, a method such as a beam search method or a greedy algorithm can be used. The beam search method is used as an example, words are selected based on the probability of the word in the word list, to form a sequence. The word list can be obtained in advance through statistics collection in advance by using a corpus.

For ease of description, a specific beam search example in which there are only three words, namely, "I", "am", and "student", in the word list, and a beam size is 2 is described.

Referring back to FIG. 3, at the first moment, the neuron of the neural network 302 outputs two (two is the beam size) words "I" (for example, a probability is 0.5) and "am" (for example, a probability is 0.4) as predicted headwords based on an input semantic vector and a sequence start identifier.

That is, $Y_1$ has two possible values, respectively corresponding to the words "I" and "am" in the word list. "I" and "am" are used as inputs to the neuron of the neural network 302 at the second moment, and the semantic vector obtained by the neural network 301 is retained. When "I" is used as an input to the neuron at the second moment, each word is obtained as probability distribution output for $Y_2$.

For example, a finally determined probability of "I" is 0.3, a finally determined probability of "am" is 0.6, and a finally determined probability of "student" is 0.1. When "am" is used as an input to the neuron at the second moment, each word is obtained as probability distribution output for $Y_2$. For example, "I" corresponds to 0.3, "am" corresponds to 0.3, and "student" corresponds to 0.4.

The beam size is set to 2, and therefore two sequences with the highest probabilities are retained. In this case, probabilities of all possible sequences can be calculated based on the two possible values of $Y_1$ that are obtained at the first moment:

The probability of "I I" is 0.5×0.3=0.15;
the probability of "I am" is 0.5×0.6=0.3;
the probability of "I student" is 0.5×0.1=0.05;
the probability of "am I" is 0.4×0.3=0.12;
the probability of "am am" is 0.4×0.3=0.12; and
the probability of "am student" is 0.4×0.4=0.16.

The two sequences with the highest probabilities are "I am" and "am student". The two sequences can correspond to sequences predicted at the second moment. At a subsequent moment, the neuron of the neural network 302 continuously repeats the process until an end identifier appears to obtain two sequences with the highest probabilities. The word list usually includes a large quantity of words, and a calculation process is also more complex than the previous process, but a principle is consistent. The quantity of finally obtained sequences is determined based on the beam size. When the beam size is set to 10, 10 sequences with the highest probabilities are obtained.

It is worthwhile to note that in a decoding process, an input to the neuron at moment i includes an output of the neuron at moment i−1. Therefore, probability distribution output by the model at a next moment varies with a different output of the neuron, because the output of the neuron at moment i−1 is used as a parameter that affects a learning result of the neuron at moment i. Therefore, probability distribution output at moment i varies with a different character unit or character sequence selected at moment i−1.

In the prediction process, the keyword received by the generation model needs to appear in a predicted character sequence. If the keyword is not in the word list, the word distribution probability is adjusted by using the pointer distribution, so that there is a probability that both the word in the word list and the received keyword are predicted. A method for adjusting the word distribution probability is consistent with the training process of the generation model. Details are omitted here for simplicity. The difference lies in that in this case, a weight involved in an equation is a trained model parameter.

Usually, after a word is output (that is, predicted), there is a low probability that the word is output again at a neighboring moment. For example, there is a low probability that sequence "I I" is output. In an implementation, a word (a word included in a previously output sequence) previously focused on by the model is recorded by covering a vector, and calculation is performed by using an attention mechanism, to reduce a probability of the word previously focused on in probability distribution.

When the decoder neural network in the generation model predicts a word sequence by using the beam search method, quantities of sequences output by the neuron at moments are consistent, for example, 2. In this case, for each predicted sequence, an output probability of a word can be determined based on an adjusted probability distribution calculation method at each moment. In the model training process, a low weight is assigned to an existing word in a sequence, and therefore there is a low probability that a word sequence including the existing word is included at the current moment, and there is a low probability that the same word is predicted as a neighboring word.

Based on a possible design, to diversify the predicted candidate text contents, some optimization can be performed on the predicted word. For example, FIG. 3 is used as an example. Based on the two possible values of $Y_1$ obtained at the first moment, a sequence with the highest probability can be determined for each value. That the word list includes three words "I", "am", and "student" is still used as an example. Based on the two possible values "I" and "am" of $Y_1$ that are predicted at the first moment, a sequence with the highest probability is selected from possible sequences in which the value of $Y_1$ is "I", for example, "I am". In this case, "am" can be used as a value of $Y_2$ when the value of $Y_1$ is "I". In addition, a sequence with the highest probability is selected from possible sequences in which the value of $Y_1$ is "am", for example, "am student". In this case, "student" can be used as a value of $Y_2$ when the value of $Y_1$ is "am". That is, corresponding to each headword predicted at the first moment, only one word sequence is selected from prediction results at a subsequent moment. As such, when all of possible sequences corresponding to the same word have high probabilities, a case in which there is a high similarity between predicted sequences can be alleviated, and therefore the predicted text contents are diversified.

In some implementations, the existing word can further have a distance weight, and the weight is used to describe a distance of the existing word from a current word to be predicted in the predicted word sequence. A smaller distance indicates a smaller weight. As such, the existing word cannot be completely covered in subsequent words of the word sequence, for example, "what" in the word sequence "what you do not understand, you can click what by using a ×× reading machine". Optionally, after it is determined that the word spacing is a predetermined quantity of words, it can be further determined that the distance weight is 1, that is, the corresponding word is not covered.

Then, in step 604, the text content that satisfies the condition is selected from the candidate text contents as the recommendation information of the target to be recommended.

Here, all the candidate text contents predicted in step 603 can be used as the recommendation information, or quality evaluation can be performed on the character sequences predicted in step 603 by using different methods, and one or more character sequences are determined from the character sequences as the recommendation information.

In an implementation, a candidate text content corresponding to one or more sequences with the highest probability can be selected as the recommendation information from the predetermined quantity of word sequences that are finally output in step 603 and are with the highest probabilities. For example, in the previous example, for the two sequences with the highest probabilities, the probability of "I am" is 0.3, and the probability of "am student" is 0.16. In this case, a candidate text content corresponding to the word sequence "I am" can be directly selected as the recommendation information.

In another implementation, a probability that each candidate text content obtained in step 603 is used as a sentence can be predicted by using a pre-trained language model. The language model can be trained by using a given corpus, for example, a xx encyclopedia or a news corpus. For a given sentence, assume that word sequence $P(S)=W_1, W_2, W_k$ is included. In this case, a probability of the corresponding sentence can be represented as $P(S)=P(W_1, W_2, \ldots, W_k)p(W_1)p(W_2|W_1) \ldots p(W_k|W_1, W_2, \ldots, W_{k-1})$.

Probability value $P(S)$ can fall within a range of $[0, 1]$, $p(W_1)$ represents a probability that $W_1$ is used as a headword of the sentence, $p(W_2|W_1)$ can represent a probability that $W_2$ appears after $W_1, \ldots,$ and $p(W_k|W_1, W_2, \ldots, W_{k-1})$ can represent a probability that $W_k$ appears on a basis of $W_1, W_2, \ldots,$ and $W_{k-1}$.

In an implementation, the language model can be a statistical model. That is, statistics are collected on a probability that each character unit in the corpus appears after another character unit or character sequence, a probability that each character unit appears at the beginning of a sentence, etc. For example, for two character units "I" and "am" character units, a probability that "am" appears after "I" can be the quantity of times "am" appears after "I" in the corpus/the quantity of times "I" appears in the corpus. As such, for character unit sequence $P(S)=W_1, W_2, \ldots, W_k$, $p(W_1), p(W_2|W_1), \ldots,$ and $p(W_k|W_1, W_2, \ldots, W_{k-1})$, etc. can be queried, and a product thereof can be determined as $P(S)$.

In another implementation, the language model can be determined by training a machine learning model in advance. In this case, each sentence in the corpus can be used as a training sample. The language model can be one of an n-gram model, a neural network language model (NNLM), an LSTM neural network language model, etc. The LSTM neural network is used as an example. Character vectors corresponding to character units obtained by dividing each sentence of the training sample can be sequentially input to a neuron of the LSTM, and the neuron at each moment affects a subsequent output of the neuron. A known probability 1 is used as a label to adjust a model parameter, to train the LSTM neural network. Character unit sequence $P(S)=W_1, W_2, \ldots, W_k$ is sequentially input to the trained LSTM model, and a prediction score given by the LSTM model for the sequence can be obtained, to indicate probability $P(S)$ that the character sequence is used as a sentence.

In more implementations, more types of language models can be trained. Implementations are omitted here. A larger predicted value of $P(S)$ indicates a higher probability that the character sequence is used as a sentence. Therefore, for the at least one character sequence obtained in step 603, a predetermined quantity (for example, 1) of character sequences that are predicted by using a prediction model and are with the highest probabilities can be selected as the recommendation information of the target to be recommended, or a character sequence that is predicted by using a prediction model and is with a probability greater than a predetermined probability threshold (for example, 0.5) can be selected as the recommendation information of the target to be recommended.

In still another implementation, a marketing score of each candidate text content obtained in step 603 can be predicted by using a pre-trained language model. In a process of training the language model, each training sample can correspond to one marketing text content and one manually marked marketing score label. Finally, a predetermined quantity of candidate text contents with the highest marketing scores can be selected as the recommendation information.

In yet another implementation, the at least one word sequence determined in step 603 can be screened based on information whether the at least one character sequence is a complete sentence. For example, in FIG. 3, the maximum quantity of layers of the neuron of the decoder neural network is 10. When a word sequence such as "to cultivate your baby genius, just" is predicted, it is clearly determined that the word sequence is not a complete sentence based on a grammatical feature, and the candidate text content can be preferentially screened out. Then, the recommendation information is selected from the remaining sequences by using any one of the previous methods.

In another implementation, a text content that satisfies a demand can be manually selected as the recommendation information of the target to be recommended from the candidate text contents obtained in step 603.

In the previous process, in the recommendation information generation process, only the plurality of keywords determined by the user for the target to be recommended are obtained, the at least one character sequence is predicted as the candidate text content by using the generation model for processing a natural language sequence, and the recommendation information is determined from the candidate text content. Manual participation is decreased and the manual planning level constitutes no limitation, and diversified candidate text contents can be generated, thereby improving efficiency and effectiveness of generating the recommendation information. Further, in the process of predicting a word sequence as a candidate text content by the generation model, the probability distribution of the words in the word list is adjusted by using the pointer distribution, to increase the probability that the keywords input to the model appear in a predicted word sequence, thereby improving accuracy of the prediction result of the generation model.

Figure 7:
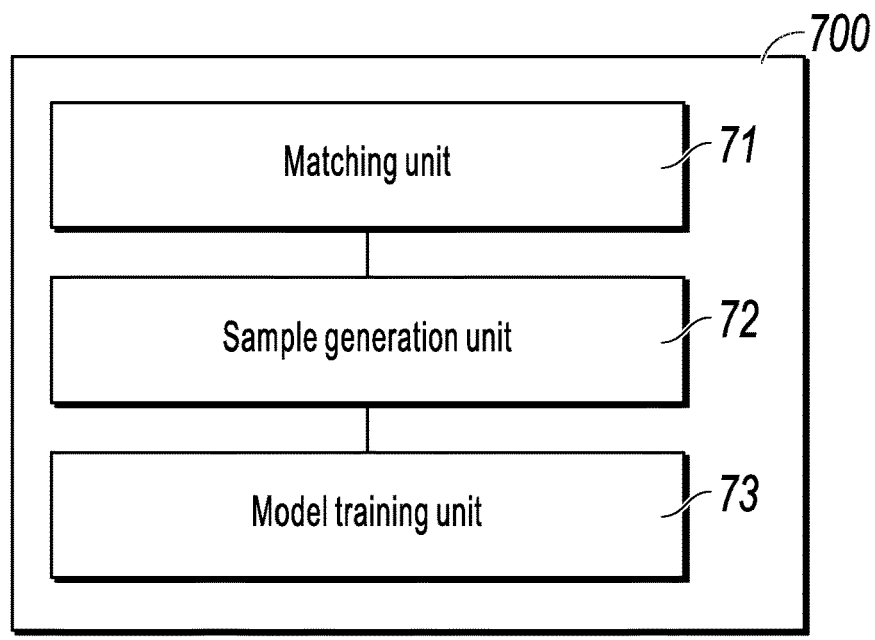
FIG. 7 is a schematic block diagram illustrating an apparatus for training a recommendation information generation model, according to an implementation.

In an implementation of another aspect, an apparatus for training a recommendation information generation model is further provided. The generation model here is an encoder-decoder network. FIG. 7 is a schematic block diagram illustrating an apparatus 700 for generating recommendation information, according to an implementation. As shown in FIG. 7, the apparatus 700 includes the following: a matching unit 71, configured to match a plurality of related text contents from a text content library by using a plurality of predetermined scenario-related words; a sample generation unit 72, configured to extract keywords from each related text content, to generate a corresponding training sample, where each training sample corresponds to each sequence pair, the sequence pair includes a source sequence and a target sequence, the source sequence is a sequence of keywords extracted from a corresponding related text content, and the target sequence is a word sequence obtained after word segmentation processing is performed on the corresponding related text content; and a model training unit 73, configured to use the source sequence corresponding to each training sample as an input to the generation model, and adjust a model parameter based on a comparison between a predicted word of the generation model and the target sequence, to train the generation model, where in a process of predicting a word by the generation model, probability distribution of words in a word list is adjusted by using pointer distribution, to increase the probability that keywords that are in the source sequence and input to the generation model appear in an output result.

In an implementation, the matching unit 71 can match the plurality of related text contents from the text content library based on at least one of the following: matching, from the text content library, a text content that includes more than a predetermined quantity of scenario-related words as the related text content; and extracting keywords from each text content in the text content library, determining a word matching degree between the text content keywords corresponding to each text content and the plurality of scenario-related words, and determining a text content whose word matching degree is greater than a matching degree threshold as the related text content.

In an implementation, the apparatus 700 further includes a screening unit (not shown), configured to perform the following operations after the matching unit 71 matches the plurality of related text contents: inputting the matched related text contents to a pre-trained classification model, to determine text content categories of the related text contents; and screening out a text content whose text content category is not a predetermined category from the matched related text contents.

The text content category can include but is not limited to at least one of the following: a news text content, an information text content, a political text content, a marketing text content, an agricultural text content, etc.

In an implementation, the generation model includes an encoder neural network and a decoder neural network, and that the model training module 73 adjusts a model parameter based on a comparison between an output result of the generation model and the target sequence includes: transmitting a source sequence received by the encoder neural network and an output result obtained based on the source sequence to a neuron of the decoder neural network at each moment, and sequentially inputting, to the decoder neural network at each moment, a target sequence obtained after a sequence start identifier is added; and comparing a predicted word of the decoder neural network at each moment with a word corresponding to each moment in a target sequence obtained after a sequence end identifier is added, and adjusting the model parameter of the encoder-decoder network.

In a further implementation, an output result of the decoder neural network at the first moment is a predetermined quantity of words, and an output result of the decoder neural network at another moment is a predetermined quantity of word sequences. An output result of the decoder neural network at each moment is determined based on a distribution probability of a current word in the word list that is determined based on an attention mechanism.

Assume that a pointer distribution weight at the first moment is positively correlated with weighted values of a state of a neuron at a current moment, an output of the neuron at the current moment, and an input word at the current moment, and weights applied to each term are model parameters; and that the model training module adjusts probability distribution of words in a word list by using pointer distribution includes: using the pointer distribution weight as a weight coefficient of a word distribution probability of the word in the word list, and using a difference between 1 and the pointer distribution weight as a weight coefficient of a word distribution probability of a word received by the encoder neural network at the current moment.

Optionally, the weight coefficient in the pointer distribution weight is adjusted based on a loss function to which a penalty of similarity between a current attention vector and the sum of historical attention vectors is added, and the loss function is positively correlated with the similarity between the current attention vector and the sum of historical attention vectors.

It is worthwhile to note that the apparatus 700 shown in FIG. 7 is an apparatus implementation corresponding to the method implementation shown in FIG. 2. Corresponding description in the method implementation shown in FIG. 2 is also applicable to the apparatus 700, and is omitted here for simplicity.

Figure 8:
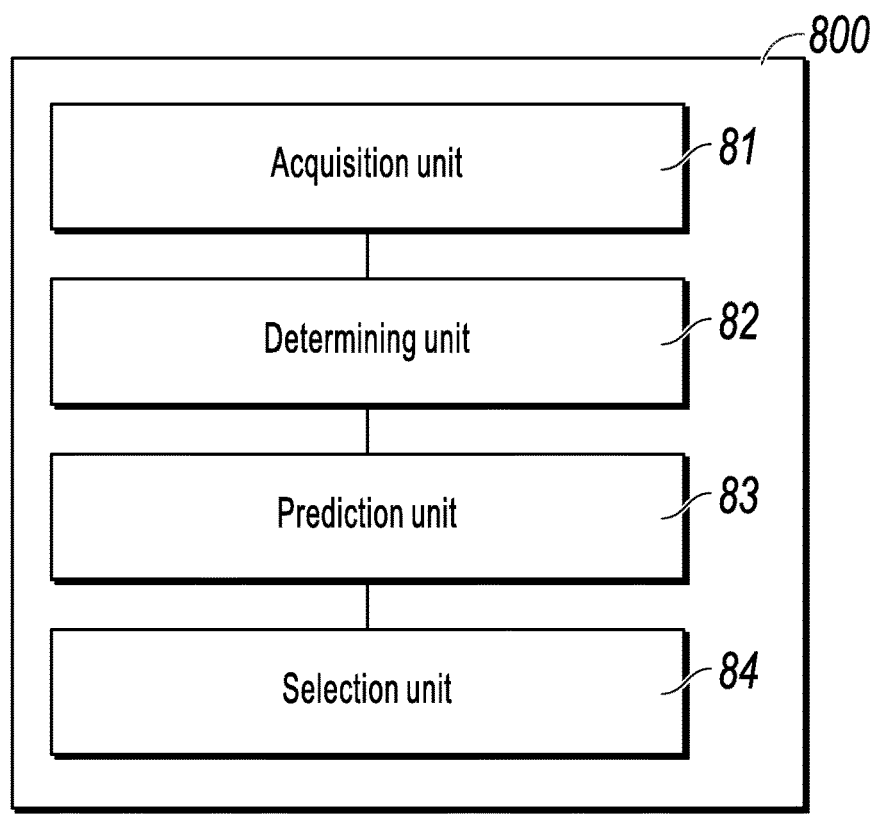
FIG. 8 is a schematic block diagram illustrating an apparatus for generating recommendation information, according to an implementation.

In an implementation of another aspect, an apparatus for generating recommendation information is further provided. FIG. 8 is a schematic block diagram illustrating an apparatus 800 for generating recommendation information, according to an implementation. As shown in FIG. 8, the apparatus 800 includes the following: an acquisition unit 81, configured to obtain a plurality of keywords provided by a user for a target to be recommended; a determining unit 82, configured to determine word vectors respectively corresponding to the keywords; a prediction unit 83, configured to sequentially input the word vectors to a pre-trained generation model, to predict a predetermined quantity of word sequences as candidate text contents, where the generation model is an encoder-decoder network, and in a process of predicting a word sequence, a probability of a word in a word list is adjusted by using pointer distribution, to increase the probability that the plurality of keywords appear in a prediction result; and a selection unit 84, configured to select a text content that satisfies a condition from the candidate text contents as recommendation information of the target to be recommended.

In an implementation, the encoder-decoder network includes an encoder neural network and a decoder neural network, the encoder neural network is configured to convert an input word sequence into a semantic vector, the decoder neural network is configured to predict a predetermined quantity of character sequences based on the semantic vector, and the encoder neural network or the decoder neural network is one of a recurrent neural network, a bidirectional recurrent neural network, a gated recurrent unit, and a long short-term memory model.

In a further implementation, the decoder neural network is configured to predict the predetermined quantity of character sequences based on the semantic vector, including: predicting a predetermined quantity of headwords at the first moment by using a neuron of the decoder neural network based on the semantic vector and a sequence start identifier; and determining, at the tth moment for each word sequence that is predicted at the (t−1)th moment and is in a one-to-one mapping relationship with each headword based on the semantic vector by using the neuron of the decoder neural network, a word with the highest probability currently, to form a current word sequence with a predicted corresponding word sequence as a word sequence predicted at the tth moment, where t is a natural number, and represents a sequence number of a moment at which the generation model predicts the current word sequence, and does not represent a specific time.

In an implementation, the selecting a text content that satisfies a condition from the candidate text contents as recommendation information of the target to be recommended includes: predicting, by using a pre-trained language model, each probability that each character sequence appears as a sentence; and selecting, based on each probability, a character sequence that satisfies one of the following conditions as the recommendation information of the target to be recommended: a character sequence belongs to a predetermined quantity of character sequences and is with the highest probability, and a character sequence is with a probability greater than a predetermined probability threshold.

It is worthwhile to note that the apparatus 800 shown in FIG. 8 is an apparatus implementation corresponding to the method implementation shown in FIG. 6. Description in the method implementation shown in FIG. 6 is also applicable to description of the apparatus 800, and is omitted here for simplicity.

In an implementation of another aspect, a computer readable storage medium is provided. The computer readable storage medium stores a computer program, and when the computer program is executed in a computer, the computer is enabled to perform the method described in FIG. 2 or FIG. 6.

In an implementation of still another aspect, a computing device is further provided, and includes a memory and a processor. The memory stores executable code, and when executing the executable code, the processor implements the method described with reference to FIG. 2 or FIG. 6.

A person skilled in the art should be aware that in the previous one or more examples, functions described in the technical concepts of the present specification can be implemented by hardware, software, firmware, or any combination thereof. When the present specification is implemented by software, the functions can be stored in a computer readable medium or transmitted as one or more instructions or code in a computer readable medium.

The objectives, technical solutions, and beneficial effects of the technical concepts of the present specification are further described in detail in the previously described specific implementations. It should be understood that the previous descriptions are merely specific implementations of the technical concepts of the present specification, and are not intended to limit the protection scope of the technical concepts of the present specification. Any modification, equivalent replacement, or improvement made based on the technical solutions of the technical concepts of the present specification shall fall within the protection scope of the technical concepts of the present specification.

What is claimed is:

1. A computer-implemented method comprising:
   selecting a plurality of scenario-related words for a scenario;
   matching the plurality of scenario-related words with text content from a text content library identify related text content that are related to the scenario;
   generating a plurality of training samples based on the related text content, wherein generating the plurality of training samples comprises, for each training sample of the plurality of training samples
      obtaining source keywords, by extracting keywords from the related text content,
      after obtaining the source keywords, obtaining a target sequence, the target sequence being a sequence of words obtained from the related text content, and
      constructing the training sample, wherein the training sample comprises a sequence pair comprising the source keywords and the target sequence; and
   for each training sample of the plurality of training samples,
      providing the source keywords of the sequence pair corresponding to the training sample as an input to a recommendation information generation model, wherein the recommendation information generation model comprises an encoder-decoder network,
      obtaining, from the recommendation information generation model, a predicted word of a word sequence, wherein the recommendation information generation model adjusts a probability distribution of words in a word list using pointer distribution to increase a probability that keywords in the source keywords that are the input to the recommendation information generation model will appear in a prediction result, and
      adjusting a model parameter of the recommendation information generation model based on a comparison between the predicted word of the recommendation information generation model and a corresponding word in the target sequence of the sequence pair corresponding to the training sample to train the recommendation information generation model.

2. The computer-implemented method of claim 1, wherein matching the plurality of scenario-related words with text content from the text content library comprises:
   determining a quantity of scenario-related words in the text content from the text content library; and
   in response to the quantity of scenario-related words in the text content being greater than a predetermined quantity of scenario-related words, identifying the text content as the related text content.

3. The computer-implemented method of claim 1, wherein matching the plurality of scenario-related words with text content from the text content library comprises:
   extracting keywords from the text content in the text content library;
   determining a word matching degree between the keywords extracted from the text content and the plurality of scenario-related words; and
   in response to the word matching degree being greater than a matching degree threshold, identifying the text content as the related text content.

4. The computer-implemented method of claim 1, further comprising:
   after identifying the related text content, inputting the related text content to a pre-trained classification model, to determine at least one text content category of the related text content; and
   screening out text content for which the at least one text content category does not include a predetermined category.

5. The computer-implemented method of claim 1, wherein the encoder-decoder network comprises an encoder neural network and a decoder neural network, and adjusting the model parameter of the recommendation information generation model comprises:

transmitting, to the decoder neural network, (i) the source keywords that have been provided as input to the recommendation information generation model and (ii) a semantic vector obtained by the encoder neural network based on the source keywords, and predicting the word sequence, by the decoder neural network, the predicting comprising
        (i) predicting an initial word of the word sequence based on the semantic vector, and
        (ii) after predicting the initial word of the word sequence, sequentially predicting subsequent words of the word sequence, based on the semantic vector and a sequence of previously predicted words of the word sequence.

6. The computer-implemented method of claim 1, wherein a pointer distribution weight is positively correlated with
    weighted values of a state of a neuron at a current moment,
    an output of the neuron at the current moment, and
    an input word at the current moment, and weights applied to each word in a sequence are model parameters; and
using pointer distribution to adjust the probability distribution of words in the word list comprises:
    using the pointer distribution weight as a weight coefficient of a word distribution probability of one of the words in the word list, and using a difference between 1 and the pointer distribution weight as the weight coefficient of the word distribution probability of the input word received by an encoder neural network of the recommendation information generation model at the current moment.

7. The computer-implemented method of claim 6, wherein the weight coefficient in the pointer distribution weight is adjusted based on a loss function to which a penalty of similarity between a current attention vector and a sum of historical attention vectors is added, the loss function being positively correlated with a similarity between the current attention vector and the sum of historical attention vectors.

8. A non-transitory, computer-readable medium storing one or more instructions executable by a computer system to perform operations comprising:
    selecting a plurality of scenario-related words for a scenario;
    matching the plurality of scenario-related words with text content from a text content library to identify related text content that are related to the scenario;
    generating a plurality of training samples based on the related text content, wherein generating the plurality of training samples comprises, for each training sample of the plurality of training samples
        obtaining source keywords, by extracting keywords from the related text content,
        after obtaining the source keywords, obtaining a target sequence, the target sequence being a sequence of words obtained from the related text content, and
        constructing the training sample, wherein the training sample comprises a sequence pair comprising the source keywords and the target sequence; and
    for each training sample of the plurality of training samples,
        providing the source keywords of the sequence pair corresponding to the training sample as an input to a recommendation information generation model, wherein the recommendation information generation model comprises an encoder-decoder network,
        obtaining, from the recommendation information generation model, a predicted word of a word sequence, wherein the recommendation information generation model adjusts a probability distribution of words in a word list using pointer distribution to increase a probability that keywords in the source keywords that are the input to the recommendation information generation model will appear in a prediction result, and
        adjusting a model parameter of the recommendation information generation model based on a comparison between the predicted word of the recommendation information generation model and a corresponding word in the target sequence of the sequence pair corresponding to the training sample to train the recommendation information generation model.

9. The computer-readable medium of claim 8, wherein matching the plurality of scenario-related words with text content from the text content library comprises:
    determining a quantity of scenario-related words in the text content from the text content library; and
    in response to the quantity of scenario-related words in the text content being greater than a predetermined quantity of scenario-related words, identifying the text content as the related text content.

10. The computer-readable medium of claim 8, wherein matching the plurality of scenario-related words with text content from the text content library comprises:
    extracting keywords from the text content in the text content library;
    determining a word matching degree between the keywords extracted from the text content and the plurality of scenario-related words; and
    in response to the word matching degree being greater than a matching degree threshold, identifying the text content as the related text content.

11. The computer-readable medium of claim 8, the operations further comprising:
    after identifying the related text content, inputting the related text content to a pre-trained classification model, to determine at least one text content category of the related text content; and
    screening out text content for which the at least one text content category does not include a predetermined category.

12. The computer-readable medium of claim 8, wherein the encoder-decoder network comprises an encoder neural network and a decoder neural network, and adjusting the model parameter of the recommendation information generation model comprises:
    transmitting, to the decoder neural network, (i) the source keywords that have been provided as input to the recommendation information generation model and (ii) a semantic vector obtained by the encoder neural network based on the source keywords, and
    predicting the word sequence, by the decoder neural network, the predicting comprising
        (i) predicting an initial word of the word sequence based on the semantic vector, and
        (ii) after predicting the initial word of the word sequence, sequentially predicting subsequent words of the word sequence, based on the semantic vector and a sequence of previously predicted words of the word sequence.

13. The computer-readable medium of claim 8, wherein a pointer distribution weight is positively correlated with
weighted values of a state of a neuron at a current moment,
an output of the neuron at the current moment, and
an input word at the current moment, and weights applied to each word in a sequence are model parameters; and
using pointer distribution to adjust the probability distribution of words in the word list comprises:
using the pointer distribution weight as a weight coefficient of a word distribution probability of one of the words in the word list, and using a difference between 1 and the pointer distribution weight as the weight coefficient of the word distribution probability of the input word received by an encoder neural network of the recommendation information generation model at the current moment.

14. The computer-readable medium of claim 13, wherein the weight coefficient in the pointer distribution weight is adjusted based on a loss function to which a penalty of similarity between a current attention vector and a sum of historical attention vectors is added, the loss function being positively correlated with a similarity between the current attention vector and the sum of historical attention vectors.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
selecting a plurality of scenario-related words for a scenario;
matching the plurality of scenario-related words with text content from a text content library identify related text content that are related to the scenario;
generating a plurality of training samples based on the related text content, wherein generating the plurality of training samples comprises, for each training sample of the plurality of training samples
obtaining source keywords, by extracting keywords from the related text content,
after obtaining the source keywords, obtaining a target sequence, the target sequence being a sequence of words obtained from the related text content, and
constructing the training sample, wherein the training sample comprises a sequence pair comprising the source keywords and the target sequence; and
for each training sample of the plurality of training samples,
providing the source keywords of the sequence pair corresponding to the training sample as an input to a recommendation information generation model, wherein the recommendation information generation model comprises an encoder-decoder network,
obtaining, from the recommendation information generation model, a predicted word of a word sequence, wherein the recommendation information generation model adjusts a probability distribution of words in a word list using pointer distribution to increase a probability that keywords in the source keywords that are the input to the recommendation information generation model will appear in a prediction result, and
adjusting a model parameter of the recommendation information generation model based on a comparison between the predicted word of the recommendation information generation model and a corresponding word in the target sequence of the sequence pair corresponding to the training sample to train the recommendation information generation model.

16. The computer-implemented system of claim 15, wherein matching the plurality of scenario-related words with text content from the text content library comprises:
determining a quantity of scenario-related words in the text content from the text content library; and
in response to the quantity of scenario-related words in the text content being greater than a predetermined quantity of scenario-related words, identifying the text content as the related text content.

17. The computer-implemented system of claim 15, wherein matching the plurality of scenario-related words with text content from the text content library comprises:
extracting keywords from the text content in the text content library;
determining a word matching degree between the keywords extracted from the text content and the plurality of scenario-related words; and
in response to the word matching degree being greater than a matching degree threshold, identifying the text content as the related text content.

18. The computer-implemented system of claim 15, the operations further comprising:
after identifying the related text content, inputting the related text content to a pre-trained classification model, to determine at least one text content category of the related text content; and
screening out text content for which the at least one text content category does not include a predetermined category.

19. The computer-implemented system of claim 15, wherein the encoder-decoder network comprises an encoder neural network and a decoder neural network, and adjusting the model parameter of the recommendation information generation model comprises:
transmitting, to the decoder neural network, (i) the source keywords that have been provided as input to the recommendation information generation model and (ii) a semantic vector obtained by the encoder neural network based on the source keywords, and
predicting the word sequence, by the decoder neural network, the predicting comprising
(i) predicting an initial word of the word sequence based on the semantic vector, and
(ii) after predicting the initial word of the word sequence, sequentially predicting subsequent words of the word sequence, based on the semantic vector and a sequence of previously predicted words of the word sequence.

20. The computer-implemented system of claim 15, wherein a pointer distribution weight is positively correlated with
weighted values of a state of a neuron at a current moment,
an output of the neuron at the current moment, and
an input word at the current moment, and weights applied to each word in a sequence are model parameters; and
using pointer distribution to adjust the probability distribution of words in the word list comprises:

using the pointer distribution weight as a weight coefficient of a word distribution probability of one of the words in the word list, and using a difference between 1 and the pointer distribution weight as the weight coefficient of the word distribution probability of the input word received by an encoder neural network of the recommendation information generation model at the current moment.

21. The computer-implemented system of claim 20, wherein the weight coefficient in the pointer distribution weight is adjusted based on a loss function to which a penalty of similarity between a current attention vector and a sum of historical attention vectors is added, the loss function being positively correlated with a similarity between the current attention vector and the sum of historical attention vectors.

* * * * *

UNITED STATES PATENT AND TRADEMARK OFFICE
CERTIFICATE OF CORRECTION

PATENT NO. : 11,176,330 B2
APPLICATION NO. : 16/814842
DATED : November 16, 2021
INVENTOR(S) : Xiexiong Lin et al.

Page 1 of 1

It is certified that error appears in the above-identified patent and that said Letters Patent is hereby corrected as shown below:

In the Claims

Column 19, Line 66, in Claim 1, delete "library identify" and insert -- library to identify --, therefor.

Column 23, Line 36, in Claim 15, delete "library identify" and insert -- library to identify --, therefor.

Signed and Sealed this
Twenty-second Day of March, 2022

Drew Hirshfeld
*Performing the Functions and Duties of the
Under Secretary of Commerce for Intellectual Property and
Director of the United States Patent and Trademark Office*